United States Patent
Chabanne et al.

(10) Patent No.: US 11,790,222 B2
(45) Date of Patent: Oct. 17, 2023

(54) METHODS FOR LEARNING THE PARAMETERS OF A CONVOLUTIONAL NEURAL NETWORK, AND FOR CLASSIFYING AN INPUT DATUM

(71) Applicant: IDEMIA IDENTITY & SECURITY FRANCE, Courbevoie (FR)

(72) Inventors: Herve Chabanne, Courbevoie (FR); Vincent Despiegel, Courbevoie (FR); Anouar Mellakh, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 1033 days.

(21) Appl. No.: 16/357,160

(22) Filed: Mar. 18, 2019

(65) Prior Publication Data
US 2019/0294864 A1 Sep. 26, 2019

(30) Foreign Application Priority Data
Mar. 20, 2018 (FR) ...................................... 1852351

(51) Int. Cl.
*G06N 3/08* (2023.01)
*G06V 40/16* (2022.01)
*G06F 18/24* (2023.01)
*G06N 3/045* (2023.01)

(52) U.S. Cl.
CPC .............. *G06N 3/08* (2013.01); *G06F 18/24* (2023.01); *G06N 3/045* (2023.01); *G06V 40/172* (2022.01)

(58) Field of Classification Search
CPC ...... G06K 9/6267; G06N 3/0454; G06N 3/08; G06V 40/172
See application file for complete search history.

(56) References Cited

U.S. PATENT DOCUMENTS

2017/0372201 A1* 12/2017 Gupta ................. G06N 3/0454
2019/0087689 A1*  3/2019 Chen ..................... H04L 9/0825

OTHER PUBLICATIONS

Yosinski et al., "How transferable are features in deep neural networks?", Part of: Advances in Neural Information Processing Systems 27 (NIPS 2014), 2014, pp. 1-9.
Preliminary Research Report received for French Application No. 1852351, dated Feb. 4, 2019, 3 pages (1 page of French Translation Cover Sheet and 2 pages of original document).
Parkhi et al., "Deep Face Recognition", British Machine Vision Conference, 2015, pp. 1-12.

(Continued)

*Primary Examiner* — Ruiping Li
(74) *Attorney, Agent, or Firm* — Womble Bond Dickinson (US) LLP

(57) ABSTRACT

The present invention concerns a method for learning the parameters of a convolutional neural network, CNN, for data classification, the method comprising the implementation of steps by data processing means (11a, 11 b, 11c) of at least one server (1a, 1b, 1c), of:

(a1) Learning, from a base of already-classified confidential learning data, the parameters of a first CNN;

(a2) Learning, from a base of already-classified public learning data, the parameters of a last fully-connected layer (FC) of a second CNN corresponding to the first CNN to which said fully-connected layer (FC) has been added.

The present invention also concerns a method for classifying an input datum.

12 Claims, 2 Drawing Sheets

(56) References Cited

OTHER PUBLICATIONS

Papernot et al., "Semi-supervised Knowledge Transfer for Deep Learning from Private Training Data", ARXIV, vol. 1610.05755v4, 2017, pp. 1-16.

Papernot et al., "Distillation as a Defense to Adversarial Perturbations Against Deep Neural Networks", 2016 IEEE Symposium On Security and Privacy, 2016, pp. 1-16.

Hinton et al., "Distilling the Knowledge in a Neural Network", NIPS, 2014, pp. 1-9.

Hamm et al., "Learning Privately from Multiparty Data", ARXIV, vol. 1602.03552v1, 2016, 13 pages.

Abadi et al., "Deep Learning with Differential Privacy", CCS '16 Proceedings of the 2016 ACM SIGSAC Conference on Computer and Communications Security, 2016, pp. 308-318.

* cited by examiner

METHODS FOR LEARNING THE PARAMETERS OF A CONVOLUTIONAL NEURAL NETWORK, AND FOR CLASSIFYING AN INPUT DATUM

GENERAL TECHNICAL FIELD

The present invention relates to the field of supervised learning, and in particular to methods for learning the parameters of a convolutional neural network, or for classifying an input datum by means of a convolutional neural network.

STATE OF THE ART

Neural networks are massively used for data classification.

After an automatic learning phase (generally supervised i.e. on an already-classified reference database) a neural network «learns» and becomes capable alone of applying the same classification to unknown data.

Convolutional Neural Networks (CNN) are a type of neural network wherein the pattern of connection between neurons is inspired by the visual cortex of animals. They are therefore particularly suitable for a particular type of classification i.e. image analysis; they allow efficient recognition of objects or persons in images or videos, notably for security applications (automatic surveillance, threat detection, etc.).

One utilization of CNN that is especially known concerns policing and antiterrorism. More specifically, police forces possess databases of photographs e.g. faces of lawbreaking individuals. It is possible to train CNNs to recognize faces in video-surveillance data, in particular to detect wanted individuals. Similarly, it can be contemplated that governments could have biometric databases e.g. of passport fingerprint data. It would then be possible to train CNNs to recognize the fingerprints of particular individuals.

At the current time, one issue raised is that these databases are confidential, and restricted (national in particular). Yet, it would be desirable for example for the police forces of several States to cooperate and improve the global efficiency of recognition, without the possibility however of reverse engineering back to confidential data.

However, in all cases, this would imply that the CNNs of one entity (e.g. the police forces of one State) would need to learn on the databases of another entity (the police forces of another State), i.e. transmit to each other in plain text the databases of photographs or other biometric features, which currently cannot be envisaged.

The problem of learning on various sets of confidential data was already raised in the document by Nicolas Papernot, Martin Abadi, Úlfar Erlingsson, Ian Goodfellow, Kunal Talwar: *Semi-supervised Knowledge Transfer for Deep Learning from Private Training Data*. ICLR 2017.

It is proposed therein to train «teachers» on each of the confidential datasets so that a «student» can be jointly trained who in fine will have knowledge of the various confidential datasets.

More specifically, the teachers will generate a learning database for the student by classifying unlabelled public data via a teacher «vote» system, to which noise may be added to guarantee privacy of the individual sets of confidential data used for teacher training.

This technique gives satisfaction but remains limited to binary classification or at least limited to a few determined possibilities (the document gives a medical example, wherein it is predicted whether or not patients have diabetes), which will be the same irrespective of the input set of confidential data.

Therefore, it does not work for the identification/authentication of individuals on account of the non-existence of a common representational space. More specifically, the different confidential databases relate to different persons: each teacher could be trained, but aggregation thereof would be impossible since the individuals of other databases are reciprocally unknown thereto.

One first idea would be to reduce the identification/authentication issue to the comparison of pairs or triplets. For example, instead of asking the CNN if it recognizes a given face in a video-surveillance image, it could be asked whether it sees any match between this face and a photograph e.g. identity photograph of an individual. The CNN would then reply in binary fashion only, and it would hence be possible to aggregate a teacher on this basis (since all teachers will be able to propose a reply to this question).

It will be understood first that said situation would soon become unmanageable should all the databases group together thousands of persons (all comparisons would have to be done one by one). Additionally, much convergence would be lost compared with the use of loss functions (so-called LOSS layers).

It would therefore be desirable to have available a novel universal solution for learning the parameters of a CNN, on confidential databases, to classify data by means of the CNN.

SUMMARY OF THE INVENTION

In a first aspect, the present invention concerns a method for learning the parameters of a convolutional neural network (CNN), for data classification, the method comprising implementation of steps by data processing means of at least one server, of:

(a1) Learning, from a base of already-classified confidential learning data, the parameters of a first CNN;

(a2) Learning, from a base of already-classified public learning data, the parameters of a last fully-connected layer of a second CNN corresponding to the first CNN to which said fully-connected layer has been added.

According to other advantageous, nonlimiting characteristics:

said data are biometric data, in particular images of faces;

step (a1) is implemented for a plurality of bases of already-classified confidential learning data, to learn the parameters of a plurality of first CNNs, step (a2) being implemented for each of the first CNNs using the same base of already-classified public learning data to learn the parameters of a plurality of second CNNs;

the method comprises a step (a3) to classify data of a second base of public data not yet classified, by means of the second substitution CNN or CNNs;

step (a3), for each datum of said second public database, comprises the classification of this datum independently by each of the second CNNs, and aggregation of the results of classification;

step (a3) comprises the adding of noise to the classification results before aggregation;

the method comprises a learning step (a4) from the second base of public learning data now classified, to learn the parameters of a third CNN comprising a last fully-connected layer;

the third CNN has the same architecture as the second CNNs;

step (a4) comprises the deletion of said last fully-connected layer of the third CNN.

In a second aspect, the present invention concerns a method for classifying an input datum, characterized in that it comprises implementing steps of:
- (a) Learning a third CNN, conforming to the method in the first aspect of the invention;
- (b) Classifying said input datum, using the data processing means of the terminal, by means of the third CNN.

In a third and fourth aspect, the invention proposes a computer programme product comprising code instructions to execute a method according to the first or second aspect for learning parameters of a convolutional neural network, CNN, or for classifying an input datum; and storage means readable by computing equipment in which a computer programme product comprises code instructions to execute a method according to the first or second aspect for learning parameters of a convolutional neural network CNN, or for classifying an input datum.

DESCRIPTION OF THE FIGURES

Other characteristics and advantages of the present invention will become apparent on reading the following description of a preferred embodiment. This description is given with reference to the appended drawings in which.

DETAILED DESCRIPTION

Architecture

According to two complementary aspects of the invention, there are proposed:
- a method for learning the parameters of a convolutional neural network (CNN), for data classification; and
- a method for classifying an input datum using a CNN learnt with the first method.

Figure 1:
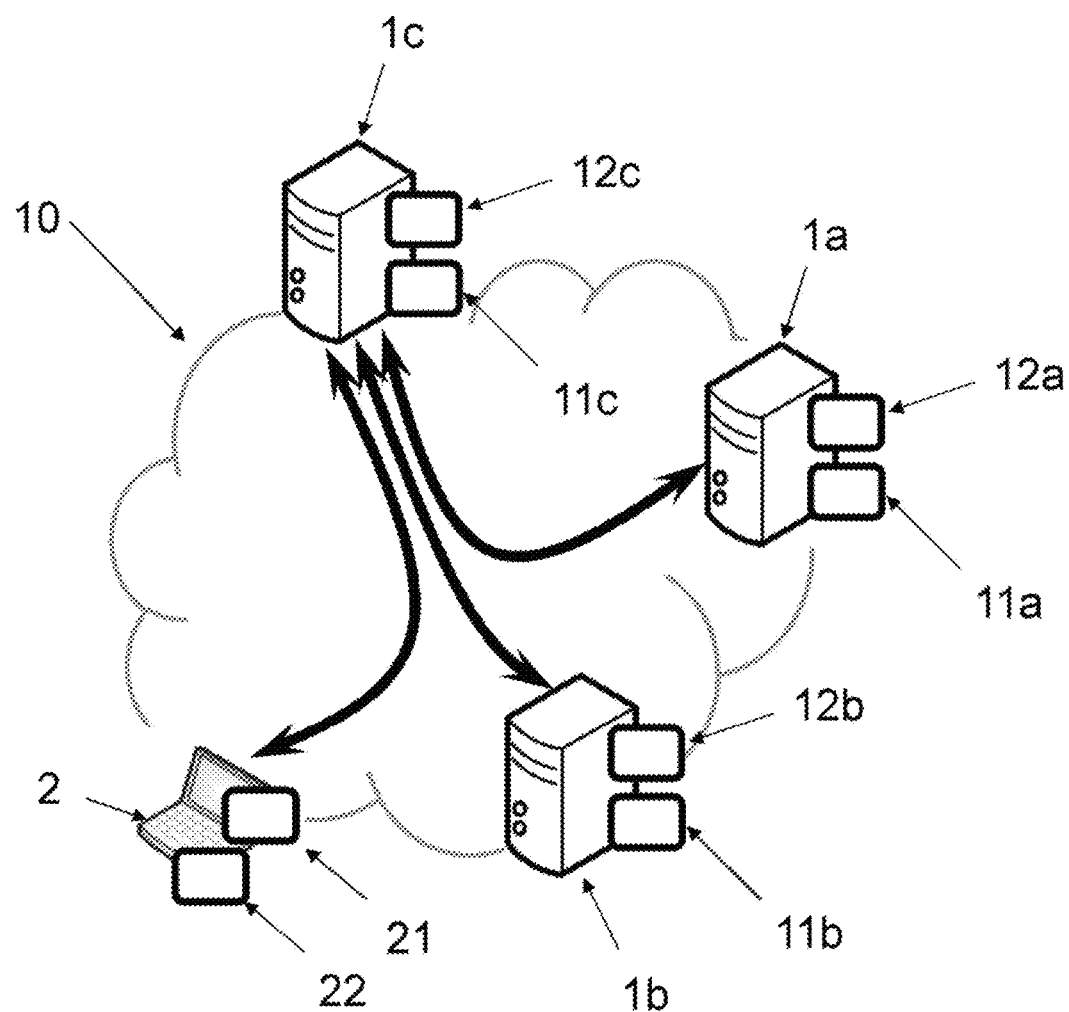
FIG. 1 is a schematic of one architecture for implementation of the methods of the invention.

These two types of methods are implemented within an architecture such as illustrated in FIG. 1, by means of one or more servers 1a, 1, 1c and a terminal 2. The server(s) 1a, 1b, 1c are the learning equipment (implementing the first method) and the terminal 2 is classification equipment (implementing the second method) e.g. video-surveillance data processing equipment.

In all cases, each item of equipment 1a, 1b, 1c, 2 is typically remote computing equipment connected to a wide area network 10 such as the internet for exchange of data. Each comprises data processing means 11a, 11b, 11c, 21 of processor type, and data storage means 12a, 12b, 12c, 22 such as a computing memory e.g. a disc.

At least one of the servers 1a, 1b, 1c stores a base of confidential learning data i.e. a set of already-classified data (as opposed to so-called input data that it is precisely sought to classify). Preferably, there are at least two bases of already-classified confidential learning data, stored on two separate servers (1a and 1b in FIG. 1), without interaction: server 1 does not have access to the database of server 1b and vice-versa.

For example, these are databases of national police forces in two States.

In this respect, said input data or learning data are preferably personal data i.e. personal to an individual (and therefore requiring confidentiality), and in particular are either biometric data (by definition personal to the owner thereof) or personal alphanumerical data (typically name, forename, date and place of birth, address, etc.). It is to be noted that the invention is not limited to these two types of personal data, for example they may concern a signature, seal, etc.

In general, classification of a personal datum typically entails recognition of the individual concerned, and in this respect the present classification method of an input personal datum can be a method for identifying an individual by means of a personal datum of said individual.

It is to be noted that the present method is not limited to personal data, and input or learning data can represent images, sound, etc. (said classification being recognition of an object, animal, etc.).

In the preferred embodiment of biometric data, the input or learning data are typically again representative of images and are even directly images of biometric features (face, fingerprint, iris, etc.), or directly preprocessed data derived from biometric features (e.g. position of minutiae for fingerprints). In the remainder of this description, the example will be taken of face images, but it will be understood that it is not limited to this embodiment.

In general, personal data and in particular biometric data are «non-quantifiable» data (in that a face or fingerprint has no numerical value) for which there is no common representational space.

Server 1c is an optional server which does not have any learning database (or at least no confidential database, but it will be seen that it can have at least one first public learning database). The role of this server 1c can perfectly well be carried out by either one of servers 1a, 1b, but preferably it is a separate server (i.e. partitioned) to prevent any risk of disclosure of the confidential databases of servers 1a, 1b.

CNN

A CNN generally contains four types of layers, successively processing information:
- the convolution layer, which processes input blocks one after the other;
- the nonlinear layer, which allows adding of nonlinearity to the network and hence much more complex decisional functions;
- the pooling layer, allowing several neurons to be grouped together into a single neuron;
- the fully-connected layer, connecting all the neurons of one layer to all the neurons of the preceding layer.

The activation function of the nonlinear layer NL is typically the ReLU function (Rectified Linear Unit) which equals $f(x)=\max(0, x)$, and the most frequently used pooling layer (denoted POOL) is the MaxPool2×2 function which corresponds to a maximum between four values of a square (four values are placed in common into one).

The convolution layer, denoted CONV, and the full-connected layer denoted FC, generally correspond to a scalar product between the neurons of the preceding layer and the weights of the CNN.

Typical CNN architectures stack a few pairs of CONV→NL layers then add a POOL layer, repeating this scheme $[(CONV \rightarrow NL)^p \rightarrow POOL]$ until an output vector of sufficiently small size is obtained, and terminate with two fully-connected layers FC.

Below is a typical CNN architecture (an example of which is given in FIG. 2a):

INPUT→[[CONV→NL]$^p$→POOL]$^n$→FC→FC

Learning Method

Figure 2:
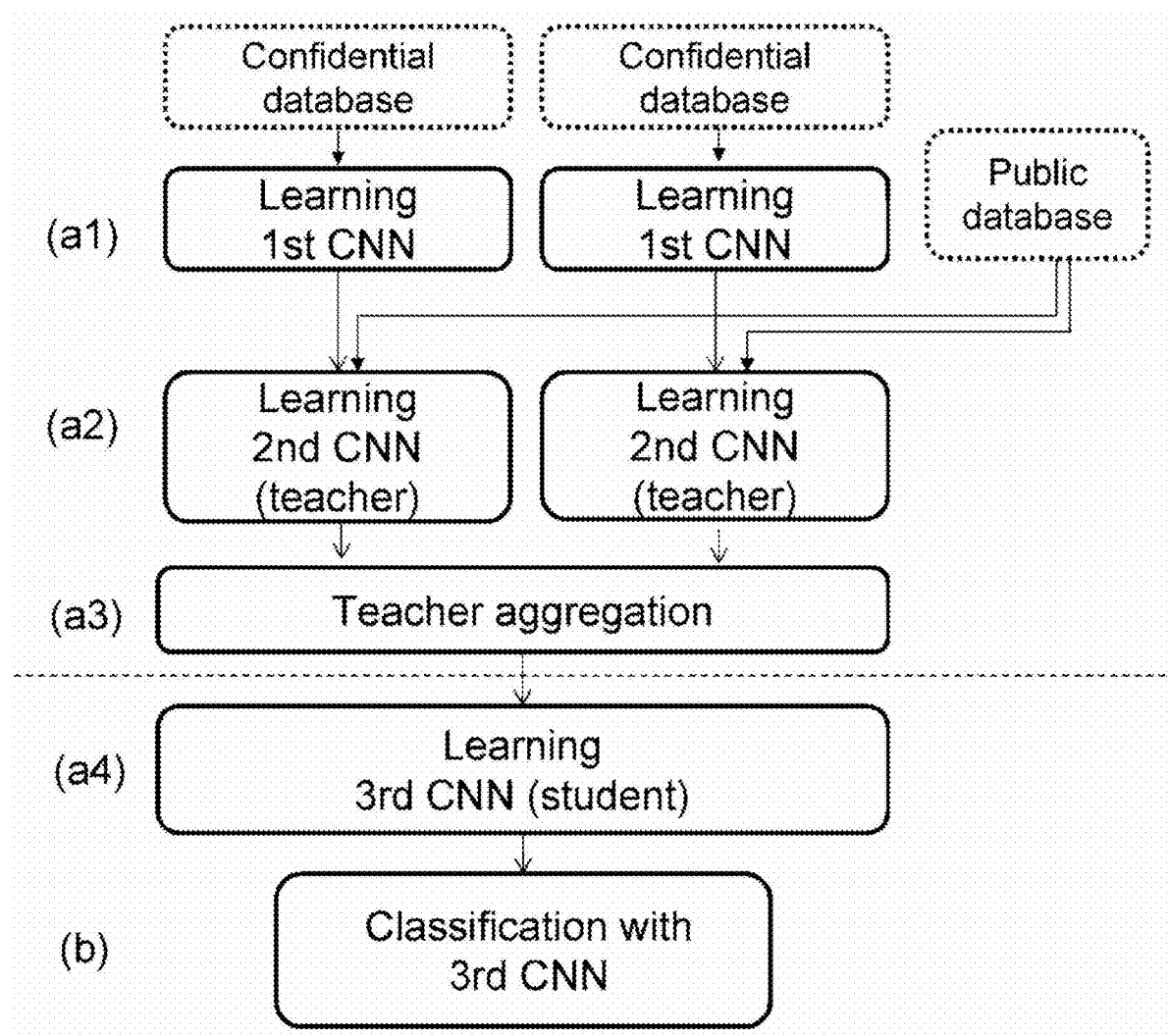
FIG. 2 schematically illustrates the steps of the learning method of the invention.

In a first aspect there is proposed, with reference to FIG. 2, the learning method implemented by the data processing means 11a, 11b of at least one server 1a, 1b, 1c.

Preferably, the learning method starts with an «individual» phase corresponding at least to step (a1) and optionally step (a2), which can be performed independently by each server 1a, 1b on its confidential database.

At step (a1), from said base of already-classified confidential learning data, the server 1a, 1b in manner known per se learns the parameters of a first CNN. If there are several servers 1a, 1b having independent bases of already-classified confidential learning data, step (a1) as explained can be implemented for each one to learn the parameters of a plurality of first CNNs, i.e. one for each confidential database.

Advantageously, all the first CNNs have the same architecture and they are preferably feature extraction CNNs (i.e. characteristics, differentiating features), particularly biometric, and not necessarily classification CNNs. More specifically, the first CNNs are not necessarily capable of sending a classification result of a datum in the confidential database on which they have learnt, but are at least capable of producing a representation of the features of this datum in a representational space.

It will be understood that after step (a1), each first CNN has a representational space particular thereto.

At step (a2), first CNNs are astutely converted to second CNNs, these having a common representational space.

To achieve this, from a base of already-classified learning data that this time is public (which we will call first public database to distinguish from a base of public learning data not yet classified, described below), the server 1a, 1b, 1c learns the parameters of a last fully-connected layer (FC) of a second CNN corresponding to the first CNN to which said layer FC has been added.

Optionally, step (a2) is implemented for each of the first CNNs using the same first base of already-classified public learning data, to learn the parameters of a plurality of second CNNs, i.e. a second CNN is obtained per confidential database, all the second CNNs advantageously again having the same architecture.

It is understood that the second CNNs correspond to the first CNNs each completed with a FC layer. More specifically, common classification capability (in said first public database) is given to the first CNNs on the basis of their feature extraction capability. A common representational space of classifications is thereby obtained.

Step (a2) is to be understood as a learning step of only the missing parameters of the second CNNs, i.e. the parameters already learnt for the first CNNs are kept and are «retrained» to learn the FC layer, upon the same data, forcing the onset of the common space.

Persons skilled in the art are able to use an already-classified public database to implement step (a2), bearing in mind that by «public» it is meant that the data are not confidential and can be freely shared. The first public database differs from each of the confidential databases. It is possible either specifically to form this first public database, or to use an available database. If the data are photographs of faces, as an example mention can be made of the IMDB database (Internet Movie DataBase), from which it is possible to extract images of N=2622 individuals with up to 1000 images per individual, see Omkar M. Parkhi, Andrea Vedaldi, Andrew Zisserman: *Deep Face Recognition.* BMVC 2015.

Step (a2) can be implemented by each of the servers 1a, 1b provided that they access said first public database, or alternatively it is the server 1c which can take this in charge in centralized manner.

It is to be noted that the learnt classification, rather than a simple binary response, may graduate responses to obtain nuances of which use can be made, knowing which classes are the closest, see the document by Geoffrey Hinton, Oriol Vinyals, Jeff Dean: *Distilling the Knowledge in a Neural Network.* NIPS 2014. This simply means that where a conventional classification determines THE class that it considers to be that of an input datum (e.g. the name of the person in the photo), the present classification can indicate one or more potential classes, optionally with a confidence level.

At steps (a3) and (a4), implemented by the common server 1c for example, procedure is advantageously similar to that proposed in the document by Nicolas Papernot, Martin Abadi, Úlfar Erlingsson, Ian Goodfellow, Kunal Talwar: *Semi-supervised Knowledge Transfer for Deep Learning from Private Training Data.* ICLR 2017 first mentioned above.

More specifically, the second CNNs are teachers able to train a student.

Step (a3) therefore comprises the classification of data of a second as yet non-classified public database, by means of the second substitution CNN or CNNs, and step (a4) comprises learning from the second base of now-classified public learning data, of the parameters of a third CNN comprising a last FC layer. The third CNN preferably has similar architecture to that of the second CNNs.

In manner known per se step (a3), for each datum of said second public database, preferably comprises the classification of this datum independently by each of the second CNNs, and the aggregation of classification results i.e. the teachers' votes. As explained, step (a3) may comprise the adding of noise to the classification results before aggregation, so that it is not possible to reverse engineer back to the teachers' confidential databases. Skilled persons are able to apply any other characteristic of the learning technique described in the above-mentioned document.

It will be understood that at step (a4), the student learns by using the common representational space of the classifications obtained at step (a2). With reference to FIG. 2, the horizontal dotted line separates data that are not accessible, the confidential databases (first and second CNNs) from data that are accessible (the classification of the second public database, the third CNN).

Finally, when the third CNN i.e. the student is obtained, its last FC layer can be deleted to revert to a feature extraction CNN.

Classification Method

In a second aspect, a method for classifying an input datum is proposed, implemented by the data processing means 21 of terminal 2.

The classification method comprises two steps: at a first step (a) the learning of a third CNN is implemented such as previously defined, and at a second step (b) the data processing means 21 of terminal 2 classify said input datum by means of the third CNN.

This method is implemented in conventional manner, it is just to be understood, as explained, that having knowledge solely of the third CNN, it is impossible to reverse engineer back to the confidential databases which allowed learning of the first CNNs.

Computer Programme Product

In a third and fourth aspect, the invention concerns a computer programme product comprising code instructions for the execution (in particular on the data processing means 11a, 11b, 11c, 21 of one or more servers 1a, 1b, 1c or of the terminal 2) of a method according to the first aspect of the invention to learn the parameters of a CNN or a method according to the second aspect of the invention to classify an input datum, and storage means readable by computing equipment (a memory 12a, 12B, 12c, 22 of one or more servers 1a, 1b, 1c or of the terminal 2) containing this computer programme product.

The invention claimed is:

1. A method for learning the parameters of a convolutional neural network (CNN), for data classification, the method comprising steps by a data processor of at least one server, of:
   (a1) learning, from a dataset of already-classified confidential learning data, the parameters of a first CNN, said first CNN comprising a plurality of layers;
   (a2) after the parameters of the plurality of layers of the first CNN have been learnt:
      building a second CNN by adding a fully connected layer to the plurality of layers of the first CNN; and
      learning, from a dataset of already-classified public learning data, parameters of the second CNN;
   wherein learning parameters of the second CNN comprises learning the parameters of the fully-connected layer while keeping unchanged the learnt parameters of the plurality of layers of the first CNN.

2. The method according to claim 1, wherein said data are personal data, in particular biometric data and particularly images of faces.

3. The method according to claim 1, wherein step (a1) is implemented for a plurality of datasets of already-classified confidential learning data, to learn the parameters of a plurality of first CNNs, step (a2) being implemented for each of the first CNNs using the same dataset of already-classified public learning data to learn parameters of a plurality of second CNNs.

4. The method according to claim 1, further comprising a step (a3) of classifying data of a second dataset of as yet unclassified public data, by means of the second CNN.

5. The method according to claim 3, further comprising a step (a3) of classifying data of a second dataset of as yet unclassified public data, by means of the plurality of second CNNs and wherein step (a3) comprises, for each datum of said second dataset, classifying this datum independently by each of the plurality of second CNNs, and aggregating the classification results.

6. The method according to claim 5, wherein step (a3) comprises adding noise to the classification results before aggregation.

7. The method according to claim 4, comprising a step (a4) of learning, from the second dataset of public learning data now classified, the parameters of a third CNN comprising a last fully-connected layer.

8. The method according to claim 7, wherein the third CNN has the same architecture as the second CNN.

9. The method according to claim 7, wherein step (a4) comprises deleting said last fully-connected layer of the third CNN.

10. A method for classifying an input datum, comprising the steps of:
   (a) learning, by a data processor of at least one server, the parameters of a third convolutional neural network (CNN) comprising a last fully-connected layer, comprising steps of:
      (a1) learning, from a dataset of already-classified confidential learning data, the parameters of a first CNN, said first CNN comprising a plurality of layers;
      (a2) after the parameters of the plurality of layers of the first CNN have been learnt:
         building a second CNN by adding a fully connected layer to the plurality of layers of the first CNN; and
         learning, from a dataset of already-classified public learning data, parameters of a second CNN, wherein learning parameters of the second CNN comprises learning the parameters of the fully-connected layer while keeping unchanged the learnt parameters of the plurality of layers of the first CNN;
      (a3) classifying data of a second dataset of as yet unclassified public data, by means of the second CNN;
      (a4) learning, from the second dataset of public learning data now classified, the parameters of the third CNN;
   (b) Classifying said input datum, by a data processor of a terminal, using the third CNN.

11. Non-transitory computer readable medium storing a program causing a computer to execute the method of claim 1.

12. Non-transitory computer readable medium storing a program causing a computer to execute the method of claim 10.

* * * * *